United States Patent
Kiran et al.

(10) Patent No.: US 11,292,333 B2
(45) Date of Patent: Apr. 5, 2022

(54) SNOW ACCUMULATION PREVENTION FOR AIR INDUCTION SYSTEM

(71) Applicants: Rohitashwa Kiran, Rochester Hills, MI (US); Arturo Guzman-Magana, Windsor (CA); Mirza Muhammad Raza, Lake Orion, MI (US)

(72) Inventors: Rohitashwa Kiran, Rochester Hills, MI (US); Arturo Guzman-Magana, Windsor (CA); Mirza Muhammad Raza, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 330 days.

(21) Appl. No.: 16/431,152

(22) Filed: Jun. 4, 2019

(65) Prior Publication Data

US 2020/0384849 A1 Dec. 10, 2020

(51) Int. Cl.
*B60K 11/08* (2006.01)
*B60K 13/02* (2006.01)
*B60S 1/66* (2006.01)

(52) U.S. Cl.
CPC ............ *B60K 11/085* (2013.01); *B60K 13/02* (2013.01); *B60S 1/66* (2013.01)

(58) Field of Classification Search
CPC ...... B60K 11/085; B60K 13/02; B60K 11/08; B60S 1/66; Y02T 10/88
See application file for complete search history.

(56) References Cited

U.S. PATENT DOCUMENTS

| | | | | |
|---|---|---|---|---|
| 1,705,710 | A * | 3/1929 | Bindon | B60K 11/085 180/68.1 |
| 3,329,377 | A | 7/1967 | Peter et al. | |
| 3,912,471 | A * | 10/1975 | Cotton, Jr. | B01D 45/08 55/440 |
| 6,454,824 | B1 * | 9/2002 | Maryamchik | F28F 19/00 55/434.4 |
| 9,545,844 | B2 | 1/2017 | Forty et al. | |
| 10,179,305 | B2 * | 1/2019 | Valsler | B01D 45/16 |
| 2004/0007132 | A1 * | 1/2004 | Holmes | B01D 45/08 95/272 |

(Continued)

FOREIGN PATENT DOCUMENTS

JP 2000301995 A 10/2000
JP 2009018648 A 11/2009

(Continued)

*Primary Examiner* — Joseph J Dallo
*Assistant Examiner* — Kurt Philip Liethen
(74) *Attorney, Agent, or Firm* — Ralph E. Smith

(57) ABSTRACT

A louvered shelf for preventing snow accumulation in an air induction system of a vehicle includes a main body configured to couple to the vehicle proximate the air induction system, a plurality of airflow apertures formed in the main body configured to receive a flow of snow-laden intake air bound for the air induction system, and a plurality of louver assemblies. Each louver assembly is operably associated with one airflow aperture of the plurality of airflow apertures to establish a tortuous path for the snow-laden intake air to travel through the one airflow aperture. Snow particles are separated from the snow-laden intake air due to centrifugal forces generated from travel of the snow laden air through the tortuous path and/or the snow particles striking the louver assemblies.

18 Claims, 6 Drawing Sheets

(56) References Cited

U.S. PATENT DOCUMENTS

| | | | |
|---|---|---|---|
| 2006/0168920 A1 | 8/2006 | Cassell et al. | |
| 2010/0326026 A1* | 12/2010 | Bratton | B01D 45/08 55/440 |
| 2012/0111653 A1 | 5/2012 | Stuckey | |
| 2012/0211293 A1* | 8/2012 | Leanza | B60K 13/02 180/68.3 |
| 2015/0135661 A1* | 5/2015 | MacDonald | B01D 45/08 55/440 |
| 2015/0308338 A1* | 10/2015 | Hao | F02C 7/12 165/120 |
| 2018/0354355 A1* | 12/2018 | Temple | F01P 11/10 |

FOREIGN PATENT DOCUMENTS

| | | |
|---|---|---|
| JP | 2014118870 A | 6/2014 |
| KR | 101261924 B1 | 5/2013 |

* cited by examiner

SNOW ACCUMULATION PREVENTION FOR AIR INDUCTION SYSTEM

FIELD

The present application relates generally to vehicle air induction systems and, more particularly, to a louvered shelf to prevent snow accumulation in a vehicle air induction system.

BACKGROUND

During heavy winter storms, vehicles can ingest snow laden air through the air induction system. Continued exposure to large quantities of snow can potentially clog the air filter and restrict air flow to the engine, which can result in a significant loss of engine power. Some vehicles utilize costly or complex heating systems to melt such blockage. While such conventional systems work for their intended purpose, there remains a desire for improvement in the relevant art.

SUMMARY

According to one example aspect of the invention, a louvered shelf for preventing snow accumulation in an air induction system of a vehicle is provided. In one example, the louvered shelf includes a main body configured to couple to the vehicle proximate the air induction system, a plurality of airflow apertures formed in the main body configured to receive a flow of snow-laden intake air bound for the air induction system, and a plurality of louver assemblies. Each louver assembly is operably associated with one airflow aperture of the plurality of airflow apertures to establish a tortuous path for the snow-laden intake air to travel through the one airflow aperture. Snow particles are separated from the snow-laden intake air due to centrifugal forces generated from travel of the snow laden air through the tortuous path and/or the snow particles striking the louver assemblies.

In addition to the foregoing, the described louvered shelf may include one or more of the following features: wherein each louver assembly extends from an edge defining the associated airflow aperture; wherein each louver assembly of the plurality of louver assemblies includes an upper louver and a lower louver extending outwardly from respective opposite sides of the main body; and wherein each of the upper and lower louvers include a proximal portion coupled to a distal portion.

In addition to the foregoing, the described louvered shelf may include one or more of the following features: wherein the proximal portion extends in a first plane, and the distal portion extends in a second plane different than the first plane; wherein the main body extends in a third plane, and wherein the proximal portion is oriented at a first angle relative to the third plane, and the distal portion is oriented at a second angle relative to the first plane; wherein the first angle is between approximately 30° and approximately 60©; wherein the second angle is between approximately 135° and approximately 165°; wherein the upper and lower louvers are substantially identical and oriented symmetrically relative to the main body.

According to another example aspect of the invention, a vehicle is provided. In one example, the vehicle includes an air induction system, a heat exchanger stack, and an active grille shutter (AGS) system. The AGS system includes a grille shutter with a plurality of flaps movable between an open position and a closed position. The AGS system is spaced apart from the heat exchanger stack to define an air passage therebetween. When the flaps are moved to the closed position during snow conditions, a snow-laden airflow is directed around the AGS system and into the air passage to reach the air induction system. A louvered shelf is disposed in the air passage between the heat exchanger stack and the AGS system, and is configured to separate snow particles from the snow-laden intake air.

In addition to the foregoing, the described vehicle may include one or more of the following features: wherein the louvered shelf includes a main body configured to couple to the vehicle, a plurality of airflow apertures formed in the main body configured to receive the flow of snow-laden intake air bound for the air induction system, and a plurality of louver assemblies, each louver assembly operably associated with one airflow aperture of the plurality of airflow apertures to establish a tortuous path for the snow-laden intake air to travel through the one airflow aperture, wherein snow particles are separated from the snow-laden intake air due to centrifugal forces generated from travel of the snow laden air through the tortuous path and/or the snow particles striking the louver assemblies.

In addition to the foregoing, the described vehicle may include one or more of the following features: a control module in signal communication with the grille shutter, the control module configured to move the flaps to the closed position upon determining the existence of the snow conditions; wherein the control module is configured to move the flaps to the closed position when the ambient temperature falls below a predetermined temperature; and wherein each louver assembly extends from an edge defining the associated airflow aperture.

In addition to the foregoing, the described vehicle may include one or more of the following features: wherein each louver assembly of the plurality of louver assemblies includes an upper louver and a lower louver extending outwardly from respective opposite sides of the main body; wherein each of the upper and lower louvers include a proximal portion coupled to a distal portion, wherein the proximal portion extends in a first plane, and the distal portion extends in a second plane different than the first plane, wherein the main body extends in a third plane, and wherein the proximal portion is oriented at a first angle relative to the third plane, and the distal portion is oriented at a second angle relative to the first plane; wherein the first angle is between approximately 30° and approximately 60°, and wherein the second angle is between approximately 135° and approximately 165°; and wherein the plurality of louver assemblies are arranged in multiple rows each having two to five louver assemblies.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Described herein are systems and methods to reduce a total mass of snow reaching components of a vehicle air induction system such as, for example, the air filter. The system includes an active grille shutter (AGS) system and a louvered shelf in the front end cooling system of the vehicle. In snow conditions, the grille shutters are closed, and snow-laden intake air is forced through the louvered shelf in order to reach the air induction system. The louvered shelf creates an intentionally tortuous path, which forces snow particles to strike the louvers and fall out of the air flow path. This reduces snow ingestion into the air induction system and enables the vehicle to operate without loss of engine power due to snow blockage, while also obviating installation of separate components or snow covers during winter months.

Figure 1:
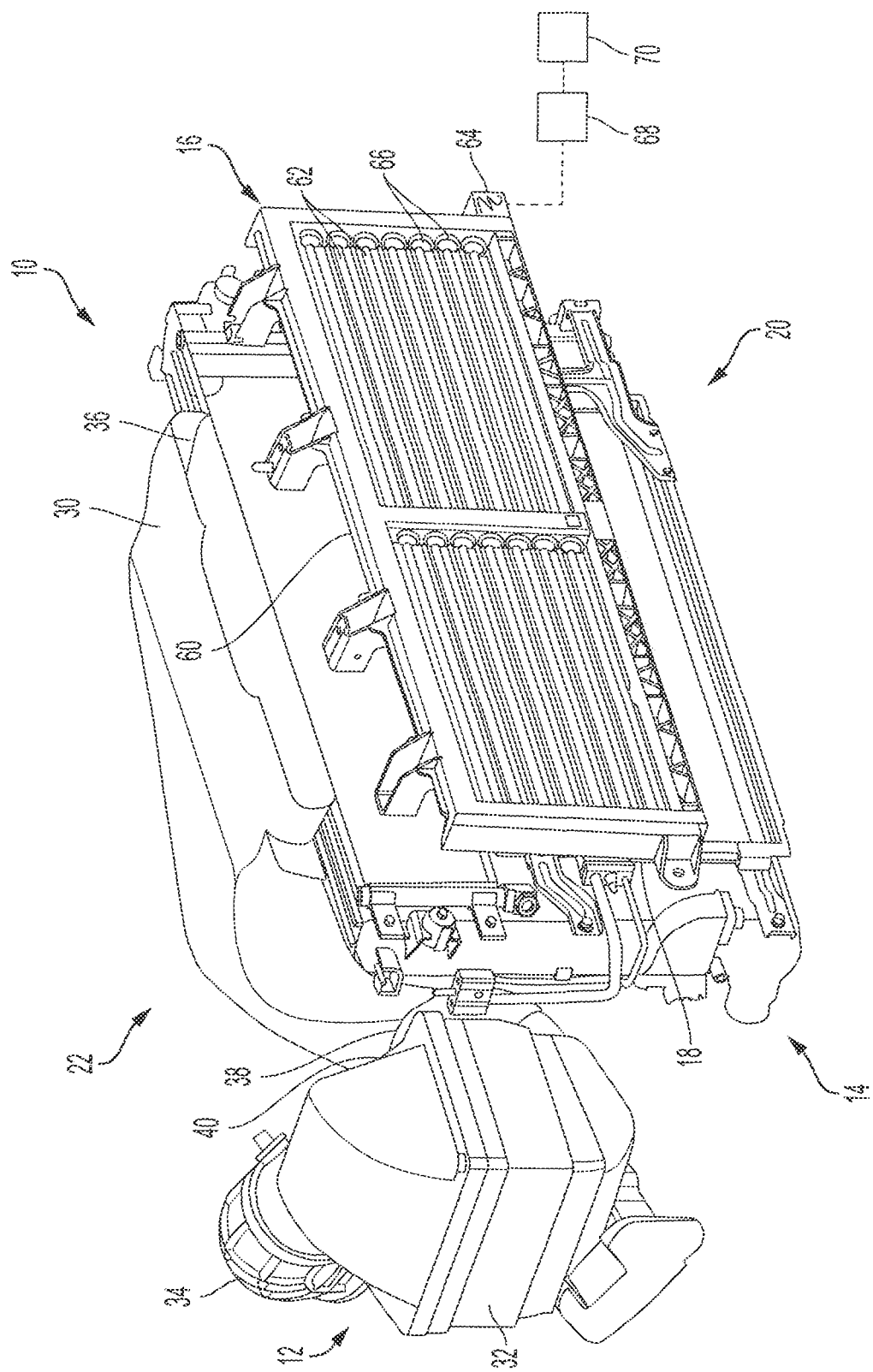
FIG. 1 is a perspective view of a portion of a vehicle including an example air induction system, heat exchanger stack, active grille shutter system, and louvered shelf in accordance with the principles of the present disclosure.
Figure 2:
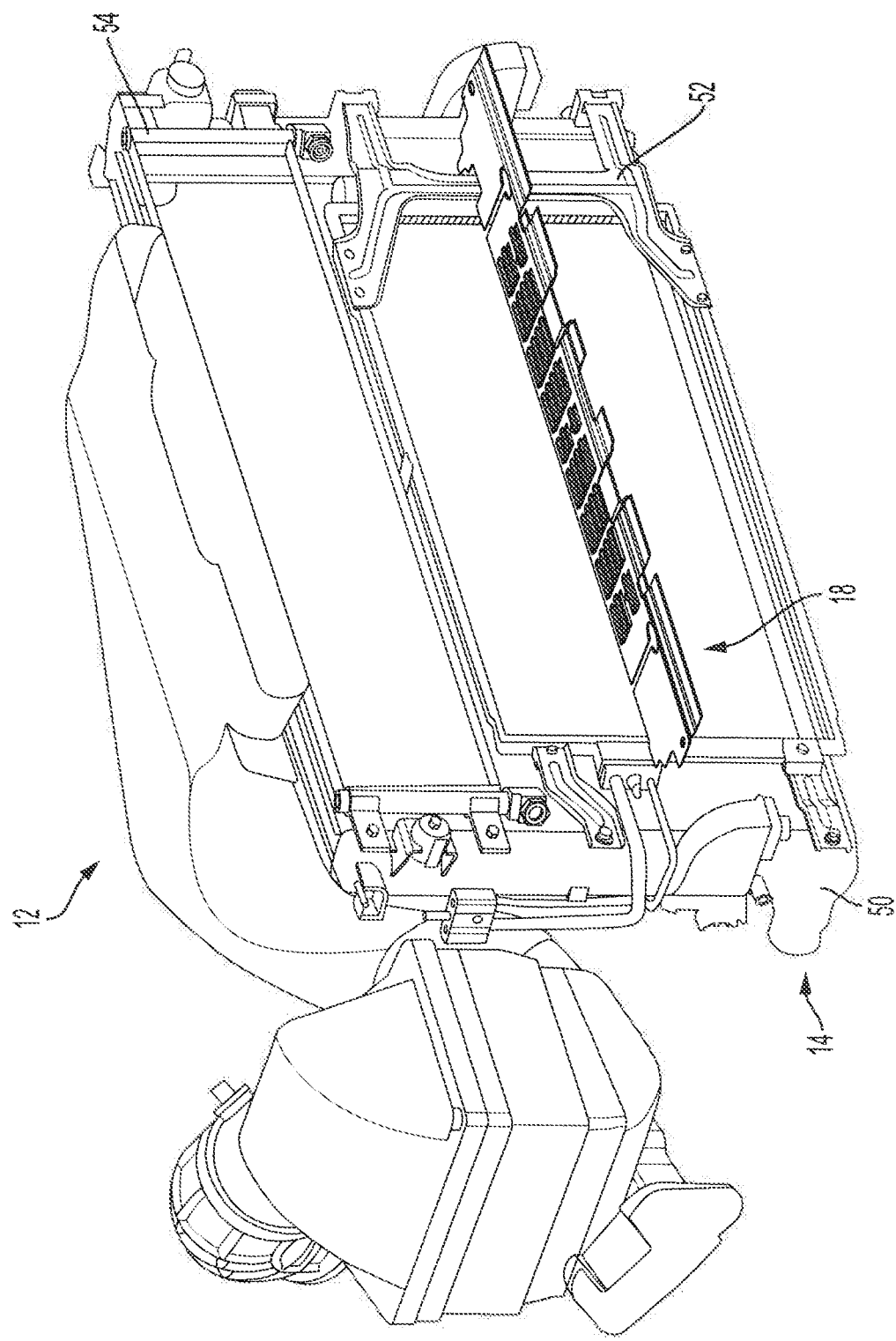
FIG. 2 illustrates FIG. 1 with the active grille shutter system removed, in accordance with the principles of the present disclosure.
Figure 3:
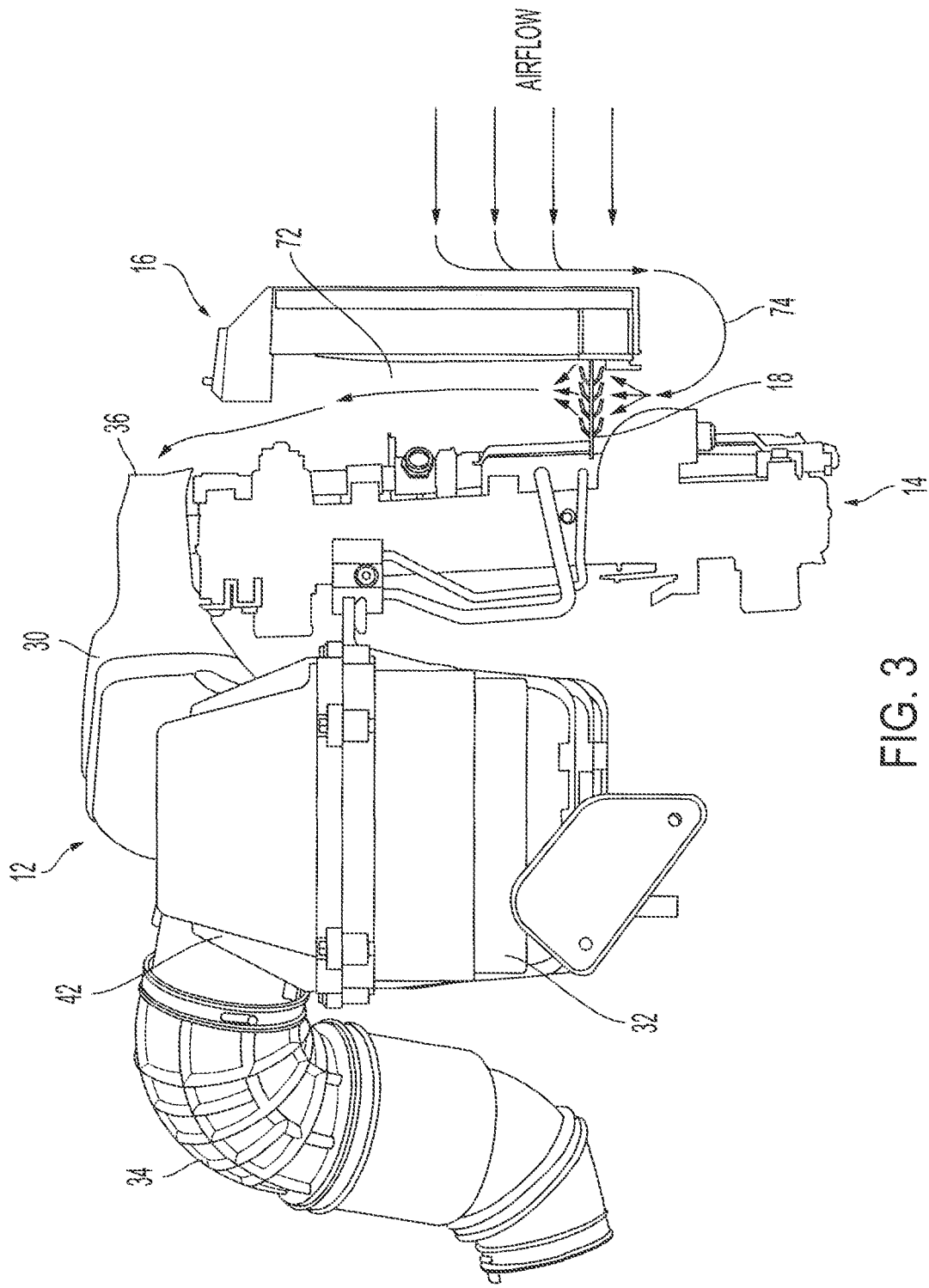
FIG. 3 is a side view of the vehicle portion shown in FIG. 1 and illustrated an example airflow therethrough, in accordance with the principles of the present disclosure.

With initial reference to FIGS. 1-3, a portion of an exemplary vehicle is illustrated and generally identified at reference numeral 10. Vehicle 10 generally includes an air induction system 12, a heat exchanger stack 14, and an active grille shutter (AGS) system 16. A louvered shelf 18 (FIGS. 2 and 3) is disposed behind the AGS system 16 and is configured to reduce ingestion of snow particles into the air induction system 12, as described herein in more detail. The AGS system 16 is disposed toward a vehicle front end 20, and the air induction system 12 is disposed toward a vehicle rear end 22.

In the example embodiment, air induction system 12 generally includes a snorkel or intake port 30, an air box 32 having an air filter (not shown), and an air induction duct 34. The intake port 30 includes an inlet 36 and outlet 38, and is connected to air box 32, which includes an inlet 40 and an outlet 42. Air supplied to the air box 32 from the intake port 30, is subsequently passed through the air filter and enters duct 34 via the air box outlet 42. The duct 34 subsequently supplies air to a charger or engine intake manifold (not shown). It will be appreciated, however, that air induction system 12 may have various other configurations based on the packaging space and various other requirements of a particular vehicle.

As shown in FIG. 2, in the illustrated example, heat exchanger stack 14 generally includes a radiator frame 50 configured to support a radiator (not shown), a condenser frame 52 configured to support an HVAC system condenser (not shown), and a transmission oil cooler frame 54 configured to support a transmission oil cooler heat exchanger (not shown). However, it will be appreciated that heat exchanger stack 14 may have various other configurations depending on the type of vehicle and packaging requirements.

In the example embodiment, the AGS system 16 generally includes a grille shutter 60 having a plurality of flaps 62, a motor 64, one or more links 66 that connect motor 64 to the grille shutter 60, and a control module 68, such as an AGS control module, that controls motor 64. In the illustrated implementation, AGS control module 68 is in signal communication with an engine control module 70 of the vehicle 10. Alternatively, control modules 68, 70 may be a single control module such as a powertrain control module. As used herein, the term control module refers to an application specific integrated circuit (ASIC), an electronic circuit, a processor (shared, dedicated, or group) and memory that executes one or more software or firmware programs, a combinational logic circuit, and/or other suitable components/systems that provide the described functionality.

In the example implementation, AGS control module 68 is configured to receive instructions from engine control module 70 indicating an amount by which to open or close flaps 62 of grille shutter 60. The instruction can include a position to which flaps 62 are to be moved or an amount that flaps 62 are to be moved or rotated. AGS control module 68 provides a command to motor 64 indicating an amount by which to open or close flaps 62. In response to the command signal, motor 64 drives the one or more links 66 to increase or decrease the opening of grille shutter 60 by the amount indicated in the command. In the example implementation, motor 64 is an electric motor. However, motor 64 may be any suitable actuator that enables AGS system 16 to function as described herein.

Engine control module 70 is configured to determine the position to which flaps 62 are to be moved based on one or more parameters. For example, engine control module 70 can receive one or more parameter values such as, for example, an ambient temperature at grille shutter 60 or a vehicle speed. However, one or more additional parameters may be used. Based on the received parameter values, engine control module 70 determines a position to which flaps 62 are to be moved. Engine control module 70 receives parameter values from any suitable source such as vehicle components and/or sensors, including AGS control module 68. In some implementations, AGS control module 68 maintains a current position of flaps 62 and provides the current position of flaps 62 to engine control module 70. The AGS control module 68 can determine the position of flaps 62 in any suitable manner.

Based on the determined position of flaps 62 and the current position of flaps 62, engine control module 70 determines whether the position of flaps 62 needs to be adjusted, and if so, an amount by which to increase or decrease the opening of grille shutter 60. Once engine control module 70 determines the amount by which to increase or decrease the opening of grill shutter 60, engine control module 70 provides the amount to increase or decrease the opening of grille shutter 60 to AGS control module 68, which subsequently instructs motor 64 to adjust the position of flaps 62 in accordance with the determined amount. In the example embodiment, during conditions where the vehicle is susceptible to ingestion of snow laden air, engine control module 70 is configured to move flaps 62 to the closed position. This operation may be performed, for example, in response to the detection of snow, the ambient temperature falling below a predetermined temperature, or other parameter.

With additional reference now to FIGS. 4-6, the louvered shelf will be described in more detail. As shown in FIGS. 2 and 3, the louvered shelf 18 is disposed behind or vehicle rearward of AGS system 16 and forward of the heat exchanger stack 14. In one example, louvered shelf 18 is coupled to radiator frame 50 and/or condenser frame 52. However, louvered shelf 18 may be coupled to any suitable structure in order to position the louvered shelf 18 between the heat exchanger stack 14 and the AGS system 16. In this arrangement, when the AGS flaps 62 are closed, an air passage 72 is defined between the AGS system 16 and the heat exchanger stack 14 such that airflow 74 passing through the front of the vehicle (e.g., grille fascia) is directed downward and around a bottom of the AGS system 16 (see FIG. 3). The airflow 74 is then directed upward through air passage 72 and into the intake port 30. As described herein in more detail, the louvered shelf 18 is disposed in and across the air passage 72 such that airflow 74 must pass through specialized features that cause entrained snow to drop out of the airflow 74.

Figure 4:
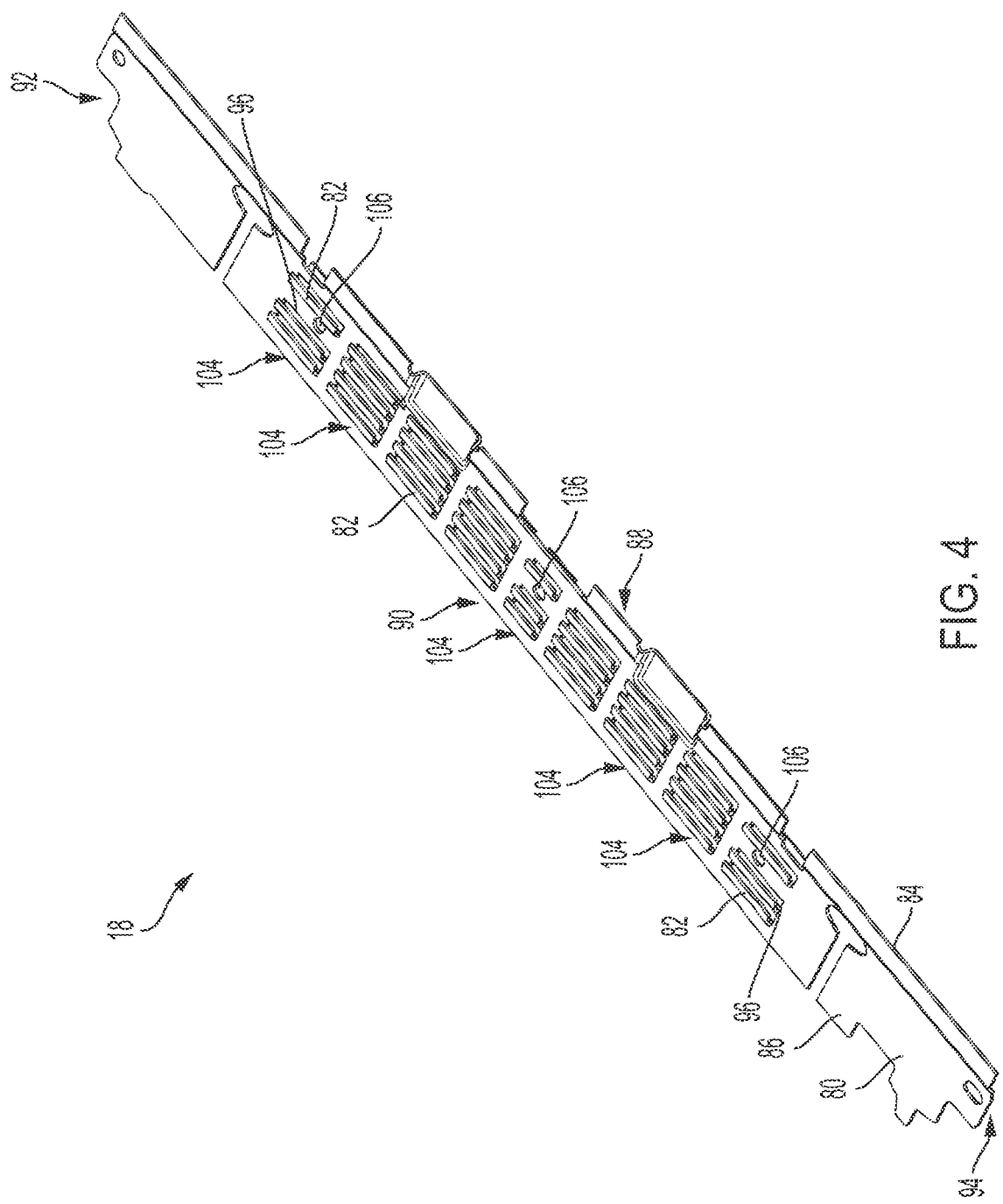
FIG. 4 is a perspective view of the example louvered shelf shown in FIGS. 1-3, in accordance with the principles of the present disclosure.
Figure 5:
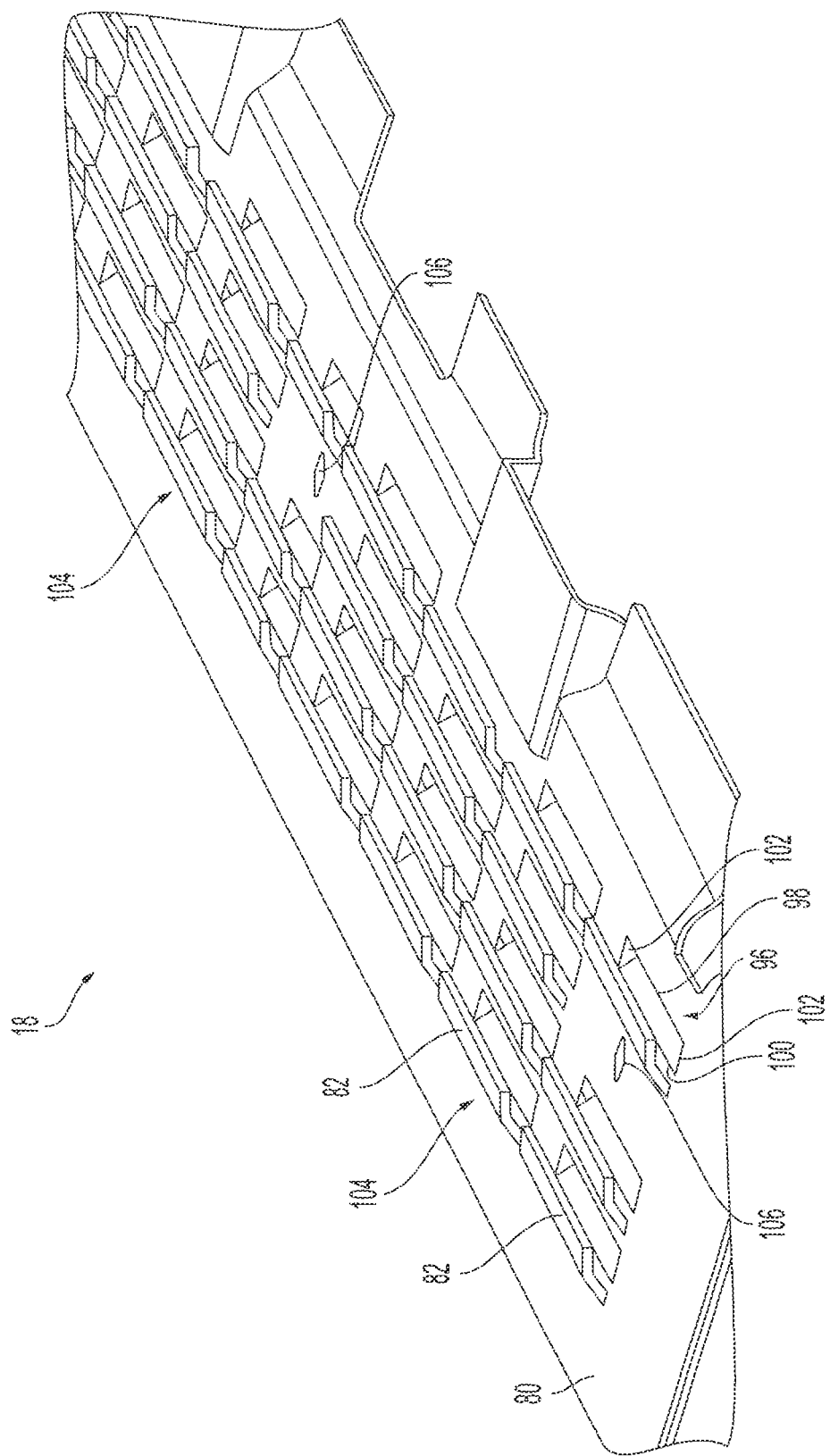
FIG. 5 is an enlarged view of the louvered shelf shown in FIG. 4, in accordance with the principles of the present disclosure.
Figure 6:
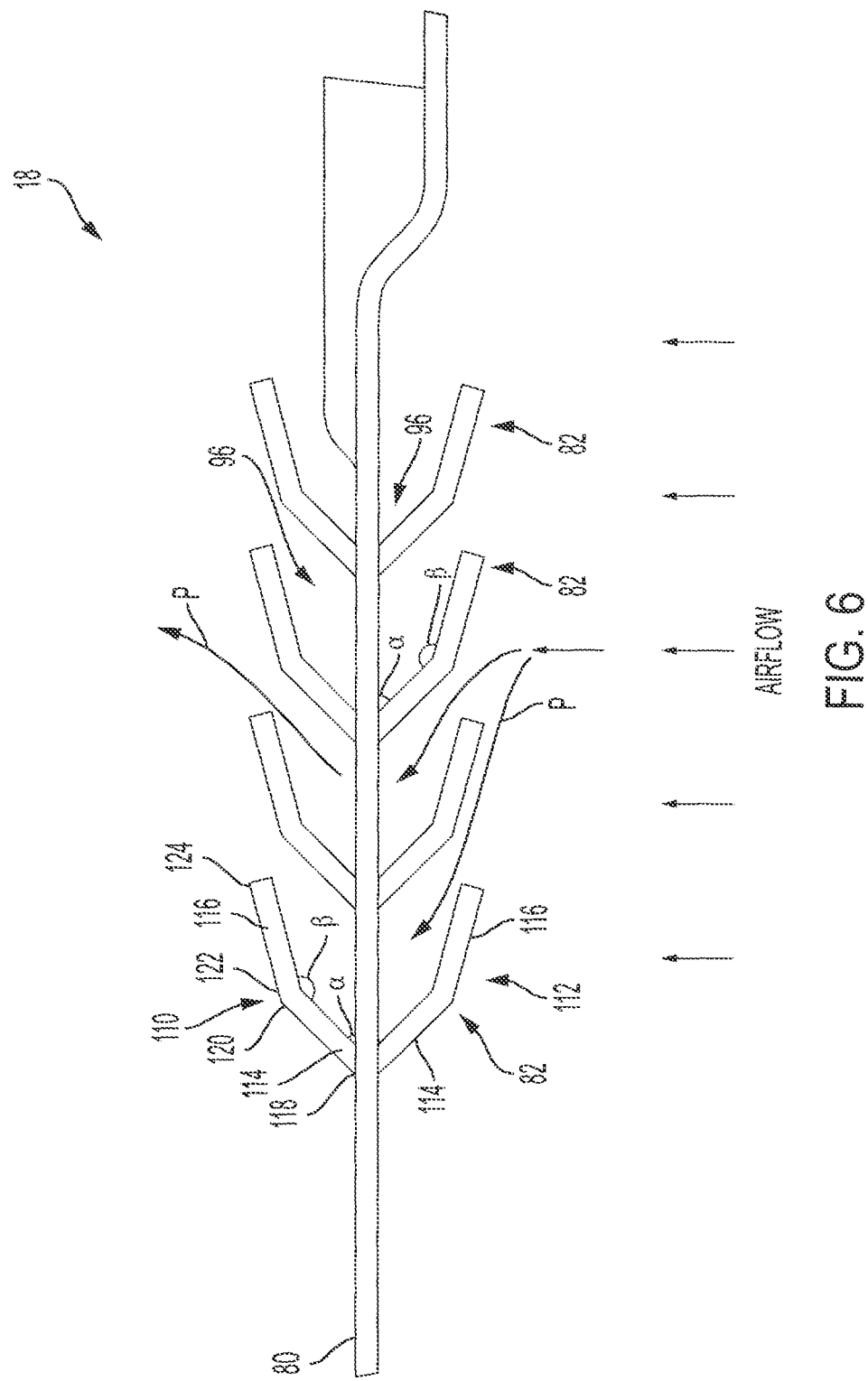
FIG. 6 is a side view of the louvered shelf shown in FIG. 4, in accordance with the principles of the present disclosure.

As illustrated in FIGS. 4-6, in the example embodiment, the louvered shelf 18 generally includes a plate-like or sheet-like main body 80 and a plurality of louvers assemblies 82. The sheet-like main body 80 includes an upper surface 84, an opposite lower surface 86, a forward end 88, a rearward end 90, and opposed sides 92, 94.

With particular reference to FIG. 5, the main body 80 includes a plurality of airflow apertures 96 formed therein configured to enable airflow 74 to pass therethrough. In the illustrated example, the airflow apertures 96 are generally rectangular. However, it will be appreciated that airflow apertures 96 may have any suitable shape that enables louvered shelf 18 to function as described herein. As shown, each airflow aperture 96 is defined by a forward edge 98, a rearward edge 100, and side edges 102. The airflow apertures 96 can be arranged in rows 104 having one or more airflow apertures 96 arranged therein. For example, as shown in FIG. 4, rows 104 may have four apertures 96, or three apertures 96 and an alternatively shaped aperture 106. However, it will be appreciated that each row 104 may have any desired number of apertures 96, 106.

With additional reference to FIG. 6, in the example embodiment, each airflow aperture 96 includes a louver assembly 82 configured to define a tortuous path 'P' that airflow 74 must travel in order to pass through louvered shelf 18. Each louver assembly 82 includes an upper louver 110 and a lower louver 112 extending in opposite directions from main body 80. In the example embodiment each louver 110, 112 includes a proximal portion 114 and a distal portion 116. The proximal portion 114 includes a first end 118 coupled to the rearward edge 100, a second end 120 coupled to the distal portion 116, and is oriented at an angle 'α' relative to a plane or longitudinal extension of the main body 80. Distal portion 116 includes a first end 122 coupled to the proximal portion 114, a free second end 124, and is oriented at an angle 'β' relative to a plane or longitudinal extension of the louver proximal portion 114. In the example embodiment, upper and lower louvers 110, 112 are identical or substantially identical and symmetrically arranged on the main body 80. However, it will be appreciated that dissimilar shapes and/or various other orientations of louvers 110, 112 are contemplated.

In one example, angle 'α' is between approximately 30° and approximately 60° or between 30° and 60°. In another example, angle 'α' is 45° or approximately 45°. In another example, angle 'β' is between approximately 135° or approximately 165° or is between 135° and 165°. In yet another example, angle 'β' is 150° or approximately 150°.

In one example operation, when snow conditions are detected, such as the ambient being below a predetermined temperature, the AGS control module 68 moves flaps 62 to the closed position if flaps 62 are not already in the closed position. Accordingly, as vehicle 10 travels, airflow 74 is directed downward and around AGS system 16, and upward into the air passage 72 between the heat exchanger stack 14 and the AGS system 16. With the grille flaps 62 closed, the air passage 72 is established as the easiest path (least resistance) for the airflow to reach the air induction system 12. As it travels upward, the airflow 74 encounters louvered shelf 18 and the tortuous path 'P' forces snow particles to strike the louvers 110, 112, which causes some or all of the snow particles to fall out of the airflow 74 (e.g., attach to the louvered shelf 18 or fall toward a bottom of the vehicle). Additionally, snow particles can separate from the airflow 74 due to centrifugal forces experienced as the airflow 74 travels about the tortuous path 'P'. The resulting airflow 74, which is thus removed of snow particles, subsequently travels to the air induction system 12. As such, louvered shelf 18 reduces the amount of snow particles reaching the air induction system 12 and thus reduces or prevents snow accumulation therein. Once snow conditions subside and if desired, the AGS control module 68 can move flaps 62 to one or more open positions to enable air to flow between flaps 62 and directly to the air induction system 12 without passing through louvered shelf 18.

Described herein are system and methods for reducing the amount of snow reaching the air filter of an air induction system during snow conditions. During such conditions, the flaps of an AGS system are closed, forcing intake air to pass through an air passage before reaching the air induction system. A louvered shelf is disposed within the air passage and includes a plurality of louvers that create a tortuous path for the airflow to pass through, which causes snow particles to be separated and removed from the airflow before reaching the air induction system. As such, loss of engine power resulting from restricted airflow caused by snow accumulation in the air induction system is reduced or prevented.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A louvered shelf for preventing snow accumulation in an air induction system of a vehicle, the louvered shelf comprising:
   a main body configured to couple to the vehicle proximate the air induction system;
   a plurality of airflow apertures formed in the main body configured to receive a flow of snow-laden intake air bound for the air induction system; and
   a plurality of louver assemblies, each louver assembly operably associated with one airflow aperture of the plurality of airflow apertures to establish a tortuous path for the snow-laden intake air to travel through the one airflow aperture,
   wherein snow particles are separated from the snow-laden intake air due to centrifugal forces generated from travel of the snow laden air through the tortuous path and/or the snow particles striking the louver assemblies.

2. The louvered shelf of claim 1, wherein each louver assembly extends from an edge defining the associated airflow aperture.

3. The louvered shelf of claim 1, wherein each louver assembly of the plurality of louver assemblies includes an upper louver and a lower louver extending outwardly from respective opposite sides of the main body, wherein the main body is a planar sheet-like body, and wherein the plurality of louver assemblies extend from the main body toward a front of the vehicle.

4. The louvered shelf of claim 3, wherein each of the upper and lower louvers include a proximal portion coupled to a distal portion.

5. The louvered shelf of claim 4, wherein the proximal portion extends in a first plane, and the distal portion extends in a second plane different than the first plane.

6. The louvered shelf of claim 5, wherein the main body extends in a third plane, and wherein the proximal portion is oriented at a first angle relative to the third plane, and the distal portion is oriented at a second angle relative to the first plane.

7. The louvered shelf of claim 6, wherein the first angle is between approximately 30° and approximately 60°.

8. The louvered shelf of claim 6, wherein the second angle is between approximately 135° and approximately 165°.

9. The louvered shelf of claim 3, wherein the upper and lower louvers are substantially identical and oriented symmetrically relative to the main body.

10. A vehicle comprising:
an air induction system;
a heat exchanger stack;
an active grille shutter (AGS) system having a grille shutter with a plurality of flaps movable between an open position and a closed position, the AGS system spaced apart from the heat exchanger stack to define an air passage therebetween,
wherein when the flaps are moved to the closed position during snow conditions, a snow-laden airflow is directed around the AGS system and into the air passage to reach the air induction system; and
a louvered shelf disposed in the air passage between the heat exchanger stack and the AGS system, the louvered shelf configured to separate snow particles from the snow-laden intake air.

11. The vehicle of claim 10, wherein the louvered shelf comprises:
a main body configured to couple to the vehicle;
a plurality of airflow apertures formed in the main body configured to receive the flow of snow-laden intake air bound for the air induction system; and
a plurality of louver assemblies, each louver assembly operably associated with one airflow aperture of the plurality of airflow apertures to establish a tortuous path for the snow-laden intake air to travel through the one airflow aperture,
wherein snow particles are separated from the snow-laden intake air due to centrifugal forces generated from travel of the snow laden air through the tortuous path and/or the snow particles striking the louver assemblies.

12. The vehicle of claim 10, further comprising a control module in signal communication with the grille shutter, the control module configured to move the flaps to the closed position upon determining the existence of the snow conditions.

13. The vehicle of claim 12, wherein the control module is configured to move the flaps to the closed position when the ambient temperature falls below a predetermined temperature.

14. The vehicle of claim 10, wherein each louver assembly extends from an edge defining the associated airflow aperture.

15. The vehicle of claim 10, wherein each louver assembly of the plurality of louver assemblies includes an upper louver and a lower louver extending outwardly from respective opposite sides of the main body.

16. The vehicle of claim 15, wherein each of the upper and lower louvers include a proximal portion coupled to a distal portion,
wherein the proximal portion extends in a first plane, and the distal portion extends in a second plane different than the first plane,
wherein the main body extends in a third plane, and
wherein the proximal portion is oriented at a first angle relative to the third plane, and the distal portion is oriented at a second angle relative to the first plane.

17. The vehicle of claim 16, wherein the first angle is between approximately 30° and approximately 60°, and wherein the second angle is between approximately 135° and approximately 165°.

18. The vehicle of claim 11, wherein:
the plurality of louver assemblies are arranged in multiple rows each having two to five louver assemblies,
the main body is a planar plate-like body disposed in a plane substantially parallel to the ground,
the main body extends in the plane generally cross-car,
an upper louver of each louver assembly extends upward from the main body, and
a lower louver of each louver assembly extends downward from the main body.

* * * * *